(12) United States Patent
Bish et al.

(10) Patent No.: US 10,220,772 B2
(45) Date of Patent: Mar. 5, 2019

(54) TRAFFIC SAFETY ALERT SYSTEM

(71) Applicant: International Business Machines Corporation, Armonk, NY (US)

(72) Inventors: Thomas W. Bish, Tucson, AZ (US);
Nikhil Khandelwal, Tucson, AZ (US);
Gregory E. McBride, Vail, AZ (US);
David C. Reed, Tucson, AZ (US);
Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 15/693,145

(22) Filed: Aug. 31, 2017

(65) Prior Publication Data
US 2017/0361769 A1    Dec. 21, 2017

Related U.S. Application Data

(63) Continuation of application No. 14/789,418, filed on Jul. 1, 2015, now abandoned.

(51) Int. Cl.
*B60Q 1/52* (2006.01)
*G06K 9/00* (2006.01)
(Continued)

(52) U.S. Cl.
CPC .......... *B60Q 1/525* (2013.01); *B60W 30/08* (2013.01); *G01S 13/931* (2013.01);
(Continued)

(58) Field of Classification Search
CPC .... B60Q 1/525; B60R 2300/00; B60W 30/08; G01S 13/931; G01S 2013/9325;
(Continued)

(56) References Cited

U.S. PATENT DOCUMENTS

| 4,903,004 A | 2/1990 | Starke et al. |
| 6,850,156 B2 | 2/2005 | Bloomfield et al. |

(Continued)

FOREIGN PATENT DOCUMENTS

| CN | 202524500 | 11/2012 |
| CN | 202677621 | 1/2013 |
| WO | 2010076594 | 7/2010 |

OTHER PUBLICATIONS

Saffarian et al.; "Enhancing Driver Car-Following Performance with a Distance and Acceleration Display", Journal IEEE Transactions on Human-Machine Systems, vol. 43, No. 1, pp. 8-16, Jan. 2013, Publisher: IEEE, Country of Publication: USA, ISSN: 2168-2291.

(Continued)

*Primary Examiner* — Quan-Zhen Wang
*Assistant Examiner* — Rajsheed O Black-Childress
(74) *Attorney, Agent, or Firm* — Kunzler, PC

(57) ABSTRACT

An apparatus for providing traffic alerts includes a distance module, analysis module, transmission module, and signaling module. The distance module measures the distance between a vehicle and an object in front of the vehicle. The analysis decides whether to signal a presence of the object that comprises determining that the measured distance is equal to or less than a threshold distance. The transmission module transmits an alert in response to the analysis module deciding to signal a presence of the object. The signaling module transmits a visual signal to one or more vehicles behind the vehicle in response to receiving the alert from the transmission module. The visual signal has one or more characteristics.

19 Claims, 8 Drawing Sheets

(51) Int. Cl.
    *G08G 1/16* (2006.01)
    *B60W 30/08* (2012.01)
    *G01S 13/93* (2006.01)

(52) U.S. Cl.
    CPC ......... *G06K 9/00825* (2013.01); *G08G 1/166* (2013.01); *B60R 2300/00* (2013.01); *G01S 2013/936* (2013.01); *G01S 2013/9325* (2013.01); *G01S 2013/9367* (2013.01); *G08G 1/167* (2013.01)

(58) Field of Classification Search
    CPC ...... G01S 2013/936; G01S 2013/9367; G06K 9/00825; G08G 1/166; G08G 1/167
    See application file for complete search history.

(56) References Cited

U.S. PATENT DOCUMENTS

| | | |
|---|---|---|
| 7,764,194 B2 | 7/2010 | Osanai |
| 7,994,902 B2 | 8/2011 | Avery et al. |
| 8,907,814 B2 | 12/2014 | Chen |
| 8,928,475 B2 | 1/2015 | Bement |
| 2008/0136618 A1 | 6/2008 | Park |
| 2011/0025484 A1 | 2/2011 | Mullick |
| 2011/0057786 A1 | 3/2011 | Giddens |
| 2011/0196580 A1 | 8/2011 | Xu et al. |
| 2012/0101713 A1 | 4/2012 | Moshchuk et al. |
| 2012/0313793 A1 | 12/2012 | Huguenot |
| 2013/0093890 A1 | 4/2013 | Cunningham |
| 2014/0062690 A1 | 3/2014 | Chang et al. |
| 2014/0067220 A1 | 3/2014 | Sieler |
| 2014/0070980 A1 | 3/2014 | Park |
| 2014/0247160 A1 | 9/2014 | Glascock |
| 2015/0025709 A1 | 1/2015 | Spaulding et al. |

OTHER PUBLICATIONS

Alyssa Newcomb, "Samsung's 'Clear' Truck Aims to Make the Roads Safer", http://abcnews.go.com/Technology/samsungs-clear-truck-aims-make-roads-safer/story?id=31942097, Jun. 22, 2015.

TRAFFIC SAFETY ALERT SYSTEM

CROSS-REFERENCE TO RELATED APPLICATIONS

This application is a continuation of and claims priority to U.S. patent application Ser. No. 14/789,418 entitled "TRAFFIC SAFETY ALERT SYSTEM" and filed on Jul. 1, 2015 for Thomas W. Bish et al., which is incorporated herein by reference in its entirety.

FIELD

The subject matter disclosed herein relates to traffic safety alert systems and more particularly relates to traffic safety alert systems for use on large trucks and other oversized vehicles.

BACKGROUND

Large trucks such as eighteen wheelers and other oversize vehicles (e.g., buses, trailers, RVs) have high and/or wide profiles. Drivers and passengers of cars and other motor vehicles traveling directly behind these trucks and oversized vehicles typically cannot see in front of them, and as a result cannot gauge traffic conditions ahead. The only indication these drivers have of the traffic conditions ahead come from the truck's brake lights.

BRIEF SUMMARY

An apparatus for providing traffic alerts is disclosed, the apparatus including a distance module, analysis module, transmission module, and signaling module. The distance module measures the distance between a vehicle and an object in front of the vehicle. The analysis decides whether to signal a presence of the object that comprises determining that the measured distance is equal to or less than a threshold distance. The transmission module transmits an alert in response to the analysis module deciding to signal a presence of the object. The signaling module transmits a visual signal to one or more vehicles behind the vehicle in response to receiving the alert from the transmission module. The visual signal has one or more characteristics.

A method for providing traffic alerts is disclosed. The method measures the distance between a vehicle and an object in front of the vehicle, decides whether to signal a presence of the object—which comprises determining that the measured distance is equal to or less than a threshold distance, transmits an alert in response to determining that the measured distance is equal to or less than the threshold distance, and transmits a visual signal to one or more vehicles behind the vehicle in response to receiving the alert.

A computer program product for providing traffic alerts is disclosed, the computer program product configured to measure the distance between a vehicle and an object in front of the vehicle, decide whether to signal a presence of the object—which comprises determining that the measured distance is equal to or less than a threshold distance, transmit an alert in response to determining that the measured distance is equal to or less than the threshold distance, and transmit a visual signal to one or more vehicles behind the vehicle in response to receiving the alert.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
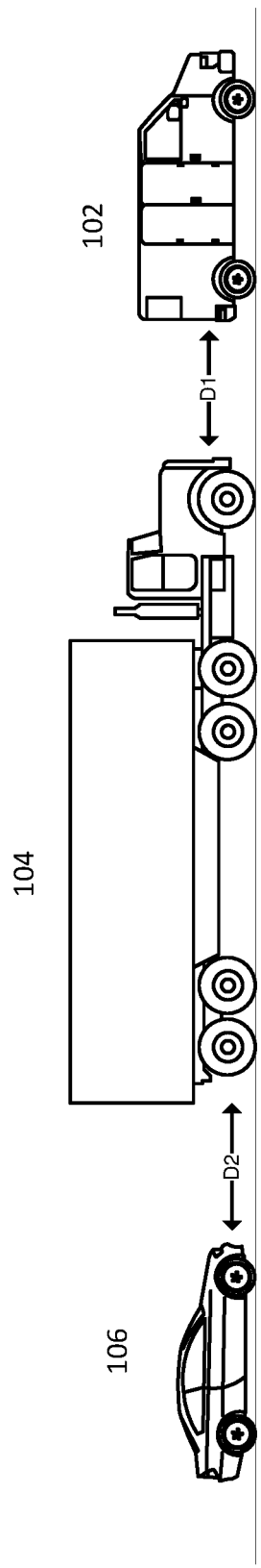
FIG. 1 illustrates a common scenario on a roadway involving a large truck or other oversized vehicle.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

FIG. 1 illustrates a common scenario on a roadway involving a large truck or other oversized vehicle. In FIG. 1, there are three vehicles 102, 104, 106 traveling on a road within the same lane. The first vehicle 102 is a van but can be any type of motorized vehicle, including without limitation, a car, truck, or motorcycle. The second vehicle 104 is a large semi-truck but can be any kind of oversized vehicle, including without limitation a bus, tanker truck, RV, or flatbed truck carrying oversized cargo. The third vehicle 106 is a car but can be any type of motorized vehicle, including without limitation, a car, truck, or motorcycle. On the road, vehicles maintain a certain distance between each other. The distance between the first vehicle 102 and the semi-truck 104 is denoted as D1. The distance between the semi-truck 104 and the third vehicle 106 is denoted as D2.

Figure 2:
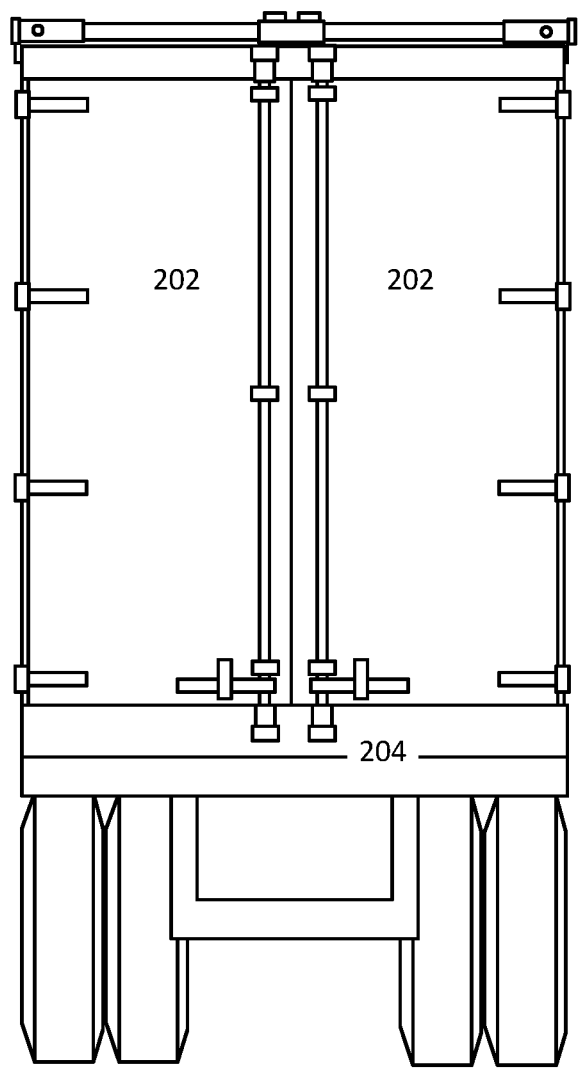
FIG. 2 is an illustration of the rear of a semi-truck trailer.

FIG. 2 is an illustration of the rear of a semi-truck trailer 200. A semi-truck trailer 200 may have one or two rear doors 202. In addition, it typically has a bumper 204 with integrated brake lights (not shown) on the ends of the bumper 204.

Figure 3:
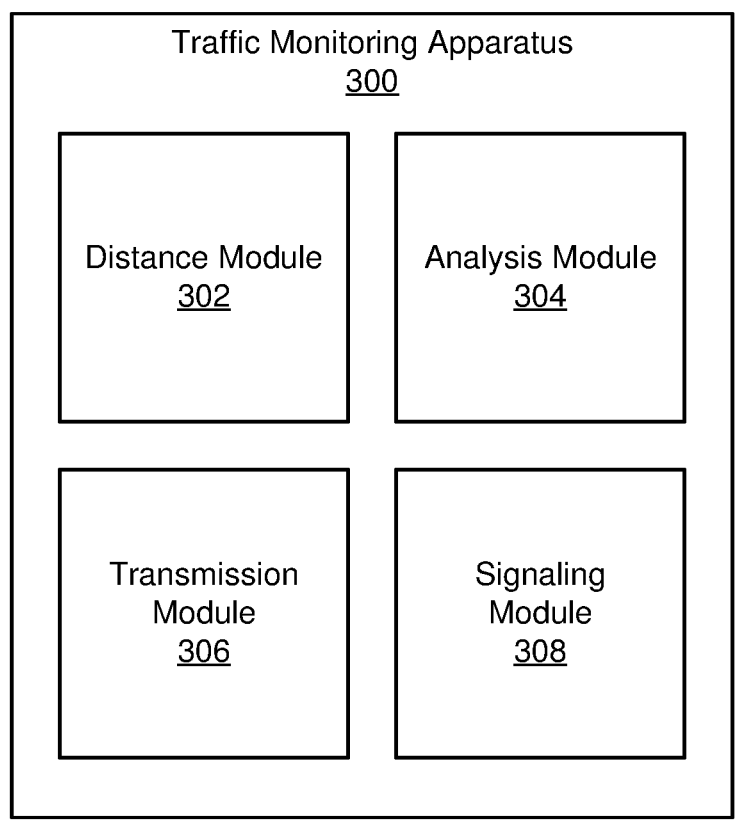
FIG. 3 is a schematic block diagram illustrating one embodiment of a traffic monitoring apparatus in accordance with one embodiment of the present invention.

FIG. 3 is a schematic block diagram illustrating one embodiment of a traffic monitoring apparatus 300 in accordance with one embodiment of the present invention. The traffic monitoring apparatus 300 includes a distance module 302, an analysis module 304, a transmission module 306, and a signaling module 308, which are described below.

The apparatus 300 may be installed on a semi-truck 104. The distance module 302 measures a distance of between the semi-truck 104 and an object in front of it on a roadway. Typically, the object in front of the semi-truck 104 is another vehicle, such as the first vehicle 102. In certain circumstances, the object in front of the semi-truck 104 may be an animal, person, or thing (e.g., crate) obstructing the roadway. The distance module 302 can measure the distance between the semi-truck 104 and the object in front of it by using one or more methods, including without limitation, radar, lidar, and one or more cameras.

The analysis module 304 decides whether to signal a presence of the object in front of the semi-truck 104 to one or more vehicles 106 behind the semi-truck 104. In one embodiment, the analysis module 304 decides whether to signal a presence of the object comprises determining whether the distance measured by the distance module 102 is equal to or less than a threshold distance. If the object in front of the semi-truck 104, such as another car, is very far ahead of the semi-truck 104 (i.e., the distance is greater than the threshold distance), there is likely no need to signal the presence of that car. But if another car in front of the semi-truck 104 is within a certain threshold distance of the semi-truck 104, it may indicate that the semi-truck 104 is moving at an excessive speed relative to the car in front of it. It may also indicate that the semi-truck 104 is tailgating the car in front of it. In either scenario, there is an increased chance of an accident if the car in front of the semi-truck 104 suddenly decelerates. The threshold distance may be set dynamically. In one embodiment, the threshold distance is a function of the speed/velocity of the semi-truck 104 such that the threshold distance increases in proportion to the speed of the semi-truck 104 as vehicles moving at higher speeds have more momentum (p=mass×velocity). In another embodiment, the threshold distance is a function of the surface friction of the roadway. For example, if the roadway is wet or icy, the threshold distance will be decreased accordingly. In yet another embodiment, the threshold distance is a function of the weight of the semi-truck 104 and/or its trailer. Heavier vehicles have more momentum (p=mass× velocity) and take longer to slow down, so the threshold distance may be increased for semi-trucks 104 with heavier trailers. The threshold distance may also be a function of the grade (slope) of the roadway. A semi-truck 104 climbing an incline will have a shorter threshold distance while a semi-truck 104 descending a hill will have a longer threshold distance given the effects of gravity.

The threshold distance, in some instances, may be equivalent to a minimal braking distance of the semi-truck 104. In other instances, the threshold distance is greater than the minimal braking distance of the semi-truck 104 to provide a margin of safety. The minimal braking distance is calculated by the estimation module 406, which is described further below. In one embodiment, the analysis module 304 deciding whether to signal a presence of the object further comprises determining that the measured distance between the semi-truck 104 and the object is less than or equal to the minimum braking distance. In another embodiment, the analysis module 304 deciding whether to signal a presence of the object further comprises determining whether to the velocity of the semi-truck 104 is equal to or greater than a threshold velocity. In this embodiment, the analysis module 304 will not signal a presence of an object in front of the vehicle 104 if it is moving too slowly. For example, in city driving with stop-and-go traffic or times of traffic congestion, the distance D1 between a semi-truck 104 and the vehicle 102 in front of it will likely be equal to or less than the threshold distance. In these scenarios, a vehicle 106 behind the semi-truck 104 will likely already be aware of vehicle 102 and thus do not need a visual signal.

The transmission module 306 transmits an alert to the signaling module 308, described further below, in response to the analysis module 304 deciding to signal a presence of the object. The alert transmitted by the transmission module 306 has a plurality of characteristics. One characteristic of an alert is its intensity. The intensity of an alert corresponds to the distance between the semi-truck 104 and the object in front of it. For example, the intensity of an alert can be inversely proportional to the distance between the semi-truck 104 and the object in front of it. Another characteristic of an alert is its duration. The duration of an alert may be measured in seconds or a fraction thereof. Yet another characteristic of an alert is a distance associated with the alert. The distance associated with an alert is equivalent to the measured distance between the semi-truck 104 and the object in front of it.

The signaling module 308 transmits (i.e., displays) a visual signal to one or more vehicles behind the vehicle 104 in response to receiving an alert from the transmission module 306. A visual signal may take various forms. In one embodiment, the visual signal may be a visual indicator on the rear of the vehicle 104. For example, the visual signal may originate from a separate light mounted on the rear of the semi-truck trailer 200, such as a door 202 or a bumper 204. As another example, the visual signal may be a LED display that shows the actual distance measured between the semi-truck 104 and the object in front of it. In one example, the visual signal may be a plurality of lights arranged in a geometric pattern on the rear of the semi-truck trailer 200.

For instance, visual signal may be a row of horizontal or vertical lights. In some instances, the visual signal may be a video showing a live feed of the roadway in front of the semi-truck 104 from one or more cameras mounted on the semi-truck 104.

A visual signal has a variety of characteristics, including without limitation, intensity, duration, frequency, pattern, and color. The intensity of a visual signal corresponds directly to the intensity of the alert received by the signaling module 308. For example, a more intense alert corresponds with a brighter visual signal. The duration of a visual signal may be measured in seconds or fractions thereof. The frequency of a visual signal indicates the rate at which the visual signal is displayed (i.e., four times per second). The frequency of a visual signal may correspond to the intensity of the alert. For example, a more intense alert may result in a more rapidly blinking LED light. The pattern of a visual signal refers to the blinking pattern of the lights that make up the visual signal. For example, a visual signal may comprise blinking lights in one or multiple directions. The color of a visual signal may change in response to the intensity of the alert.

In one embodiment, the signaling module 308 also transmits an audio signal to the one or more vehicles behind the vehicle 104 in response to receiving an alert from the transmission module 306. The audio signal transmitted by the signaling module 308 may be transmitted from the rear of the vehicle 104, such as speakers mounted on the rear of a semi-truck trailer 202. An audio signal has a variety of characteristics, including without limitation, intensity, duration, frequency, and pattern. The intensity of an audio signal corresponds directly to the intensity of the alert received by the signaling module 308. For example, a more intense alert corresponds with a louder audio signal. The duration of an audio signal may be measured in seconds or fractions thereof. The frequency of an audio signal indicates the rate at which the audio signal is transmitted (i.e., four times per second). The frequency of an audio signal may correspond to the intensity of the alert. For example, a more intense alert may result in a faster beeping sound. The pattern of an audio signal refers to the arrangement of different sounds that make up an audio signal. For example, an audio signal may comprise a pattern of beeps of varying lengths.

Figure 4:
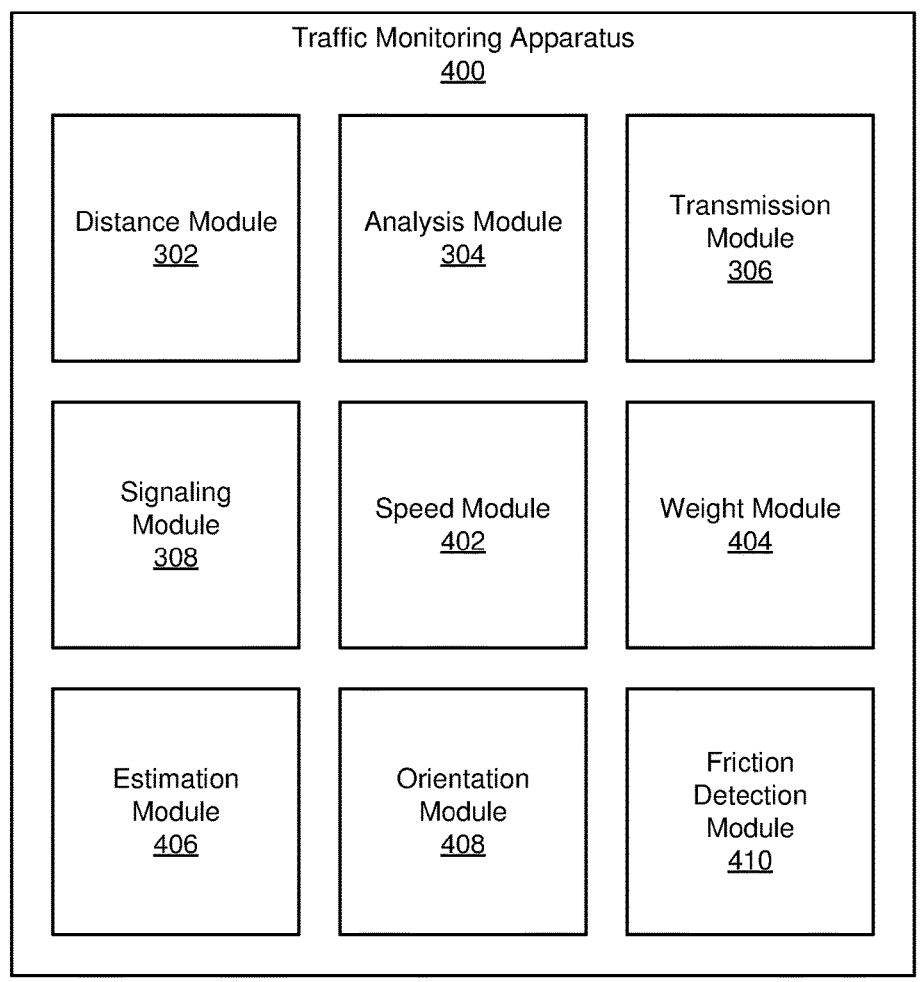
FIG. 4 is a schematic block diagram illustrating another embodiment of a traffic monitoring apparatus in accordance with one embodiment of the present invention.

FIG. 4 is a schematic block diagram illustrating another embodiment of a traffic monitoring apparatus 400 in accordance with one embodiment of the present invention. The traffic monitoring apparatus 400 includes a distance module 302, an analysis module 304, a transmission module 306, and a signaling module 308, which are substantially similar to those described above in relation to the traffic monitoring apparatus 300 in FIG. 3. The traffic monitoring apparatus 400 also includes a speed module 402, a weight module 404, an estimation module 406, an orientation module 408, and a friction detection module 410, which are described below.

The speed module 402 measures a current velocity of the vehicle 104. In one embodiment, the speed module 402 comprises the speedometer of the vehicle 104. The weight module 404 measures a weight of the vehicle 104. In one embodiment, the weight is the combined weight of the vehicle, its passengers, and cargo. In another embodiment, the weight is just the weight of the vehicle's 104 cargo (e.g., weight of trailer hauled by semi-truck 104). The estimation module 406 calculates a minimal braking distance of the vehicle 104 by taking into account the weight and velocity of the vehicle 104. Weight (or mass) and velocity are important factors in calculating braking distance because the momentum of a vehicle 104 is a function of its mass times velocity. In one embodiment, the estimation module 406 calculates a minimal braking distance of the vehicle 104 by first calculating its momentum. The estimation module 406 can then take the maximum force of the brakes of the vehicle 104 to calculate how long it will take for the vehicle 104 to come to a complete stop. Once the estimation module 406 has calculated the amount of force the amount of time it will take to stop vehicle 104, it can calculate the minimal braking distance using the current velocity of the vehicle 104. In addition to taking into account the weight and velocity of the vehicle 104, the estimation module 406 calculating the minimal braking distance of a vehicle 104 may also take into account other factors, including without limitation, the surface friction of the roadway and the grade of the roadway. The orientation module 408 measures a grade (slope) of the roadway. In one embodiment, the orientation module 408 continually measures a grade of the roadway using GPS. In another embodiment, the orientation module 408 measures an average grade of the roadway over a period of time. The friction detection module 410 measures a surface friction of the roadway. In one embodiment, the friction detection module 410 senses the lateral friction between one or more tires on the vehicle 104 and the roadway surface over a period of time.

Figure 5:
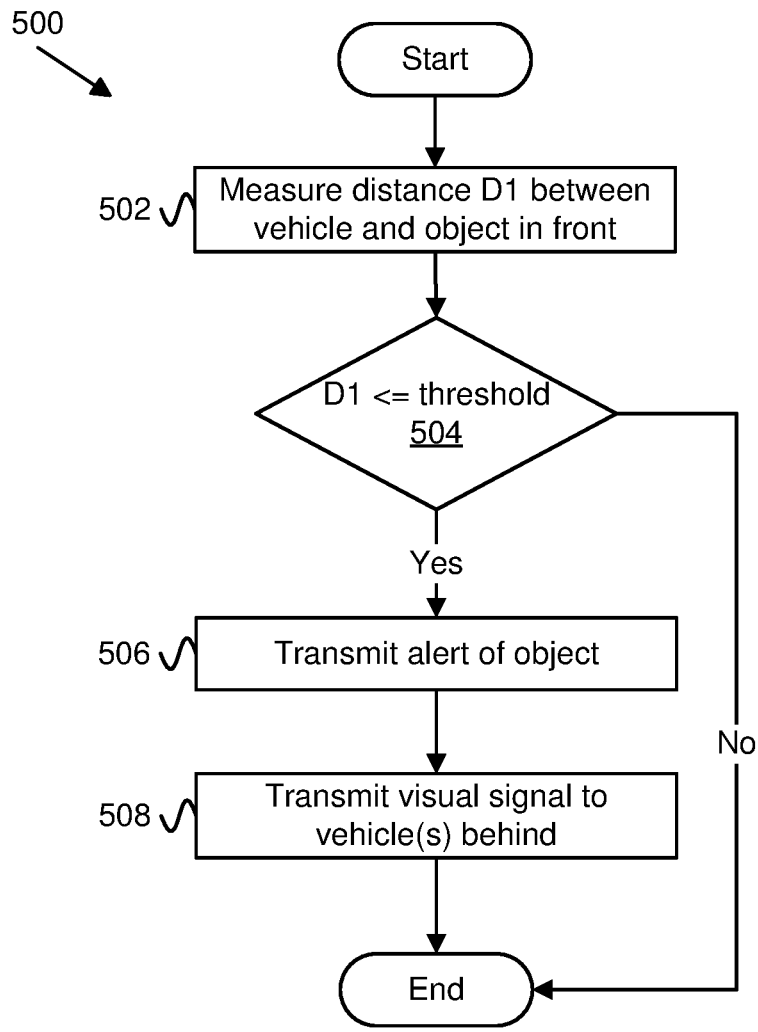
FIG. 5 is a schematic flow chart diagram illustrating one embodiment of a method for providing traffic alerts in accordance with one embodiment of the present invention.

FIG. 5 is a schematic flow chart diagram illustrating one embodiment of a method 500 for providing traffic alerts in accordance with one embodiment of the present invention. The method 500 begins and measures 502 a distance D1 between a vehicle 104 and an object in front of the vehicle 104. The method 500 determines 504 if the distance D1 is less than or equal to a threshold distance. If the distance D1 is not less than or equal to the threshold distance, the method 500 ends. If the distance D1 is less than or equal to the threshold distance, the method 500 transmits 506 an alert of the object. The method 500 transmits 508 a visual image to one or more vehicles behind the vehicle 104, and method 500 ends. A visual signal has one or more characteristics.

Figure 6:
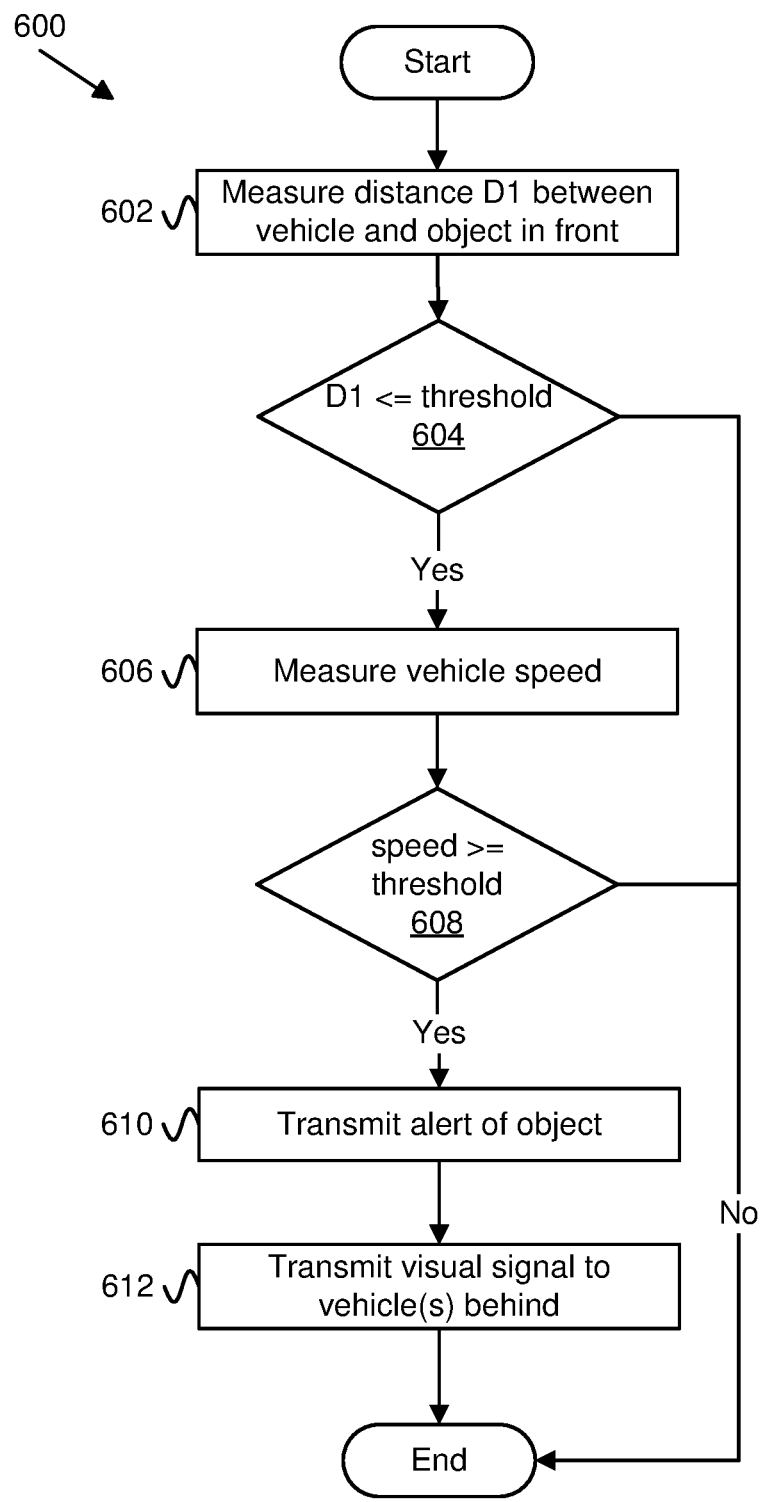
FIG. 6 is a schematic flow chart diagram illustrating another embodiment of a method for providing traffic alerts in accordance with one embodiment of the present invention.

FIG. 6 is a schematic flow chart diagram illustrating another embodiment of a method 600 for providing traffic alerts in accordance with one embodiment of the present invention. The method 600 begins and measures 602 a distance D1 between a vehicle 104 and an object in front of the vehicle 104. The method 600 determines 604 if the distance D1 is less than or equal to a threshold distance. If the distance D1 is not less than or equal to the threshold distance, the method 600 ends. If the distance D1 is less than or equal to the threshold distance, the method 600 measures 606 a speed/velocity of the vehicle 104. The method 600 determines 608 if the speed/velocity of the vehicle 104 is greater than or equal to a threshold velocity. If the velocity of the vehicle 104 is not greater than or equal to the threshold velocity, the method 600 ends. If the velocity of the vehicle 104 is greater than or equal to the threshold velocity, the method 600 transmits 610 an alert of the object. The method 600 transmits 612 a visual image to one or more vehicles behind the vehicle 104, and method 600 ends.

Figure 7:
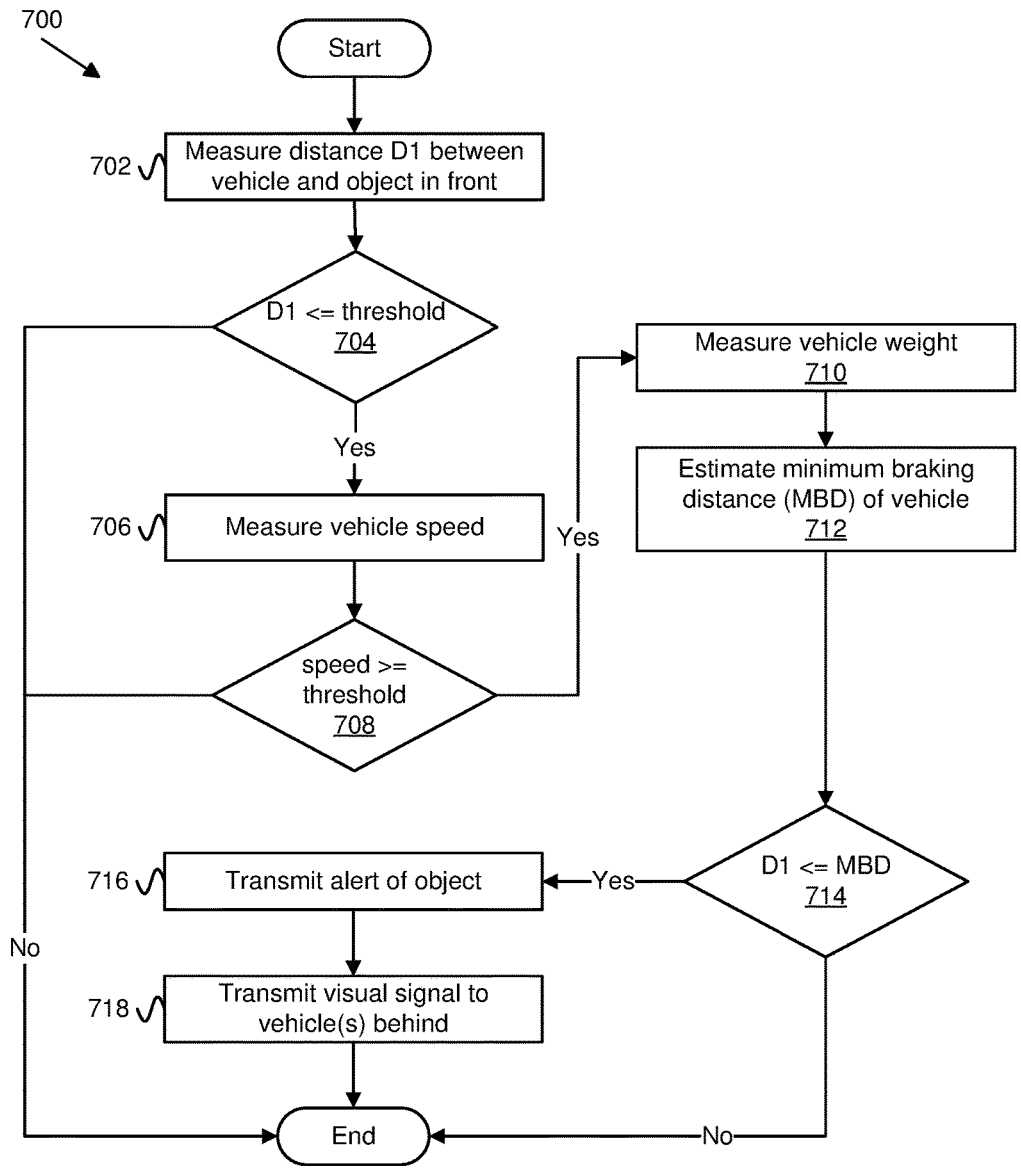
FIG. 7 is a schematic flow chart diagram illustrating still another embodiment of a method for providing traffic alerts in accordance with one embodiment of the present invention.

FIG. 7 is a schematic flow chart diagram illustrating still another embodiment of a method 700 for providing traffic alerts in accordance with one embodiment of the present invention. The method 700 begins and measures 702 a distance D1 between a vehicle 104 and an object in front of the vehicle 104. The method 700 determines 704 if the distance D1 is less than or equal to a threshold distance. If the distance D1 is not less than or equal to the threshold distance, the method 700 ends. If the distance D1 is less than or equal to the threshold distance, the method 700 measures 706 a speed/velocity of the vehicle 104. The method 700 determines 708 if the speed/velocity of the vehicle 104 is greater than or equal to a threshold velocity. If the velocity of the vehicle 104 is not greater than or equal to the threshold velocity, the method 700 ends. If the velocity of the vehicle 104 is greater than or equal to the threshold velocity, the method 700 measures 710 a weight of the vehicle 104. The method 700 estimates 712 a minimum braking distance of the vehicle 104. The minimum braking distance takes into account the weight and velocity of the vehicle 104. The method 700 determines 714 if the distance D1 is less than or equal to the minimum braking distance. If the distance D1 is not less than or equal to the minimum braking distance, the method 700 ends. If the distance D1 is less than or equal to the minimum braking distance, the method 700 transmits 716 an alert of the object. The method 700 transmits 718 a visual image to one or more vehicles behind the vehicle 104, and method 700 ends.

Figure 8:
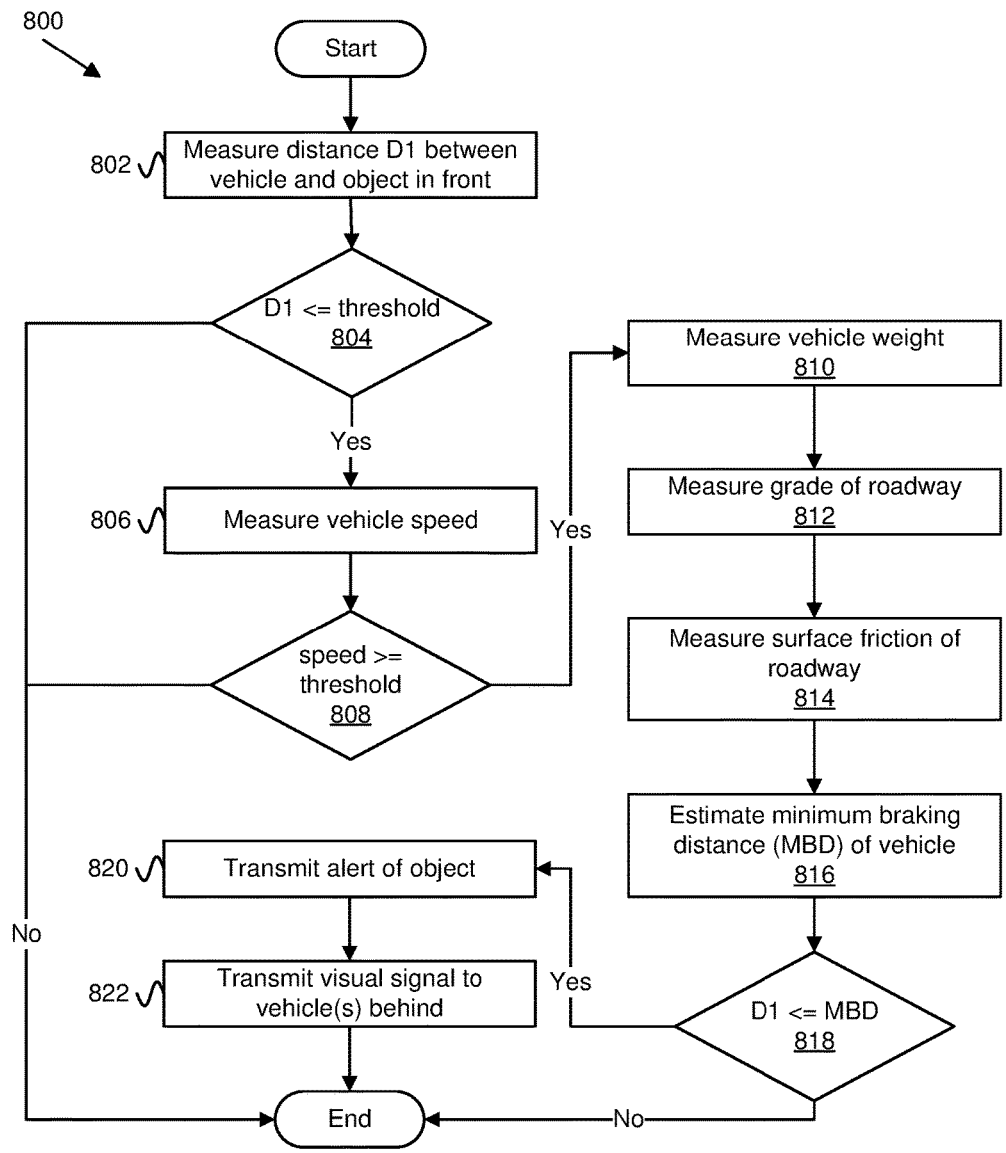
FIG. 8 is a schematic flow chart diagram illustrating yet another embodiment of a method for providing traffic alerts in accordance with one embodiment of the present invention.

FIG. 8 is a schematic flow chart diagram illustrating yet another embodiment of a method 800 for providing traffic alerts in accordance with one embodiment of the present invention. The method 800 begins and measures 802 a distance D1 between a vehicle 104 and an object in front of the vehicle 104. The method 800 determines 804 if the distance D1 is less than or equal to a threshold distance. If the distance D1 is not less than or equal to the threshold distance, the method 800 ends. If the distance D1 is less than or equal to the threshold distance, the method 800 measures 806 a speed/velocity of the vehicle 104. The method 800 determines 808 if the speed/velocity of the vehicle 104 is greater than or equal to a threshold velocity. If the velocity of the vehicle 104 is not greater than or equal to the threshold velocity, the method 800 ends. If the velocity of the vehicle 104 is greater than or equal to the threshold velocity, the method 800 measures 810 a weight of the vehicle 104. The method 800 measures 812 a grade of the roadway. The method 800 measures 814 a surface friction of the roadway. The method 800 estimates 816 a minimum braking distance of the vehicle 104. The minimum braking distance takes into account the weight and velocity of the vehicle 104 as well as the grade and surface friction of the roadway. The method 800 determines 818 if the distance D1 is less than or equal to the minimum braking distance. If the distance D1 is not less than or equal to the minimum braking distance, the method 800 ends. If the distance D1 is less than or equal to the minimum braking distance, the method 800 transmits 820 an alert of the object. The method 800 transmits 822 a visual image to one or more vehicles behind the vehicle 104, and method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a distance module that measures a distance between a vehicle and an object in front of the vehicle on a roadway;
    a speed module that measures a velocity of the vehicle;
    a weight module that measures a weight of the vehicle;
    an estimation module that calculates a minimal braking distance of the vehicle by taking into account the weight and the velocity of the vehicle;
    an analysis module that decides whether to provide a live video feed of a view from the front of the vehicle based on the distance, wherein deciding whether to provide the live video feed of the view from the front of the vehicle based on the distance comprises:
        determining whether the distance is less than or equal to a threshold distance, wherein the threshold distance is greater than the minimal braking distance to provide a margin of safety;
        in response to the distance being less than or equal to the threshold distance, determining whether the velocity is greater than or equal to a threshold velocity; and
        in response to the velocity being greater than or equal to the threshold velocity, deciding to provide the live video feed of the view from the front of the vehicle;
    a transmission module that transmits an alert in response to the analysis module deciding to provide the live video feed of the view from the front of the vehicle based on the distance; and
    a signaling module transmitting a visual signal to a visual indicator on a rear of the vehicle in response to receiving the alert, transmitting the visual signal to a separate vehicle behind the vehicle in response to receiving the alert, or a combination thereof, the visual signal comprising the live video feed of the view from the front of the vehicle;
    wherein at least a portion of the distance module, the analysis module, the transmission module, and the signaling module comprise one or more of hardware and executable code, the executable code stored on one or more computer readable storage media.

2. The apparatus of claim 1,
    wherein the analysis module deciding whether to provide the live video feed of the view from the front of the vehicle based on the distance further comprises determining that the distance is less than or equal to the minimal braking distance.

3. The apparatus of claim 2, further comprising
    an orientation module that measures a grade of the roadway;
    wherein the estimation module calculating a minimal braking distance of the vehicle further takes into account the grade of the roadway.

4. The apparatus of claim 2, further comprising
    a friction detection module that measures a surface friction of the roadway;
    wherein the estimation module calculating a minimal braking distance of the vehicle further takes into account the surface friction of the roadway.

5. The apparatus of claim 1, wherein the distance module comprises a radar device.

6. The apparatus of claim 1, wherein the alert has an intensity and the one or more characteristics of the visual signal corresponds to the intensity of the alert.

7. The apparatus of claim 1, wherein the signal module further transmits an audio signal to the one or more vehicles, the audio signal having one or more characteristics.

8. The apparatus of claim 7, wherein the alert has an intensity and the one or more characteristics of the audio signal corresponds to the intensity of the alert.

9. A method for providing traffic alerts comprising:
    measuring a distance between a vehicle and an object in front of the vehicle on a roadway;
    calculating a minimal braking distance of the vehicle by taking into account a weight and a velocity of the vehicle;
    deciding whether to provide a live video feed of a view from the front of the vehicle based on the distance, wherein deciding whether to provide the live video feed of the view from the front of the vehicle based on the distance comprises:
   determining whether the distance is less than or equal to a threshold distance, wherein the threshold distance is greater than the minimal braking distance to provide a margin of safety;
   in response to the distance being less than or equal to the threshold distance, determining whether the velocity is greater than or equal to a threshold velocity; and
   in response to the velocity being greater than or equal to the threshold velocity, deciding to provide the live video feed of the view from the front of the vehicle;
transmitting an alert in response to deciding to provide the live video feed of the view from the front of the vehicle based on the distance; and
transmitting a visual signal to a visual indicator on a rear of the vehicle in response to receiving the alert, transmitting the visual signal to a separate vehicle behind the vehicle in response to receiving the alert, or a combination thereof, the visual signal comprising the live video feed of the view from the front of the vehicle.

10. The method of claim 9, further comprising measuring the velocity of the vehicle.

11. The method of claim 10, further comprising measuring the weight of the vehicle;
wherein deciding whether to provide the live video feed of the view from the front of the vehicle based on the distance further comprises determining that the distance is less than or equal to the minimal braking distance.

12. The method of claim 11, further comprising measuring a grade of the roadway;
wherein calculating a minimal braking distance of the vehicle further takes into account the grade of the roadway.

13. The method of claim 11, further comprising measuring a surface friction of the roadway;
wherein calculating a minimal braking distance of the vehicle further takes into account the surface friction of the roadway.

14. The method of claim 9, wherein measuring the distance between the vehicle and the object in front of the vehicle on the roadway comprises using a radar device to measure the distance between the vehicle and the object in front of the vehicle on the roadway.

15. The method of claim 9, wherein the alert has an intensity and the one or more characteristics of the visual signal corresponds to the intensity of the alert.

16. A computer program product for providing traffic alerts, the computer program product comprising a computer readable storage medium having program instructions embodied therewith, the program instructions read/executed by a processor to cause the processor to:
   measure a distance between a vehicle and an object in front of the vehicle on a roadway;
   calculate a minimal braking distance of the vehicle by taking into account a weight and a velocity of the vehicle;
   decide whether to provide a live video feed of a view from the front of the vehicle based on the distance, wherein deciding whether to provide the live video feed of the view from the front of the vehicle based on the distance comprises:
      determining whether the distance is less than or equal to a threshold distance, wherein the threshold distance is greater than the minimal braking distance to provide a margin of safety;
      in response to the distance being less than or equal to the threshold distance, determining whether the velocity is greater than or equal to a threshold velocity; and
      in response to the velocity being greater than or equal to the threshold velocity, deciding to provide the live video feed of the view from the front of the vehicle;
   transmit an alert in response to deciding to provide the live video feed of the view from the front of the vehicle based on the distance; and
   transmit a visual signal to a visual indicator on a rear of the vehicle in response to receiving the alert, transmit the visual signal to a separate vehicle behind the vehicle in response to receiving the alert, or a combination thereof, the visual signal comprising the live video feed of the view from the front of the vehicle.

17. The computer program product of claim 16, the program instructions further causing the processor to measure the velocity of the vehicle.

18. The computer program product of claim 17, the program instructions further causing the processor to measure the weight of the vehicle;
wherein deciding whether to provide the live video feed of the view from the front of the vehicle based on the distance further comprises determining that the distance is less than or equal to the minimal braking distance.

19. The computer program product of claim 16, wherein the alert has an intensity and the one or more characteristics of the visual signal correspond to the intensity of the alert.

* * * * *